US008700292B2

United States Patent
Cook

(10) Patent No.: US 8,700,292 B2
(45) Date of Patent: Apr. 15, 2014

(54) ENGINE PERFORMANCE EQUALIZATION SYSTEM AND METHOD

(76) Inventor: David Cook, Novi, MI (US)

( * ) Notice: Subject to any disclaimer, the term of this patent is extended or adjusted under 35 U.S.C. 154(b) by 0 days.

(21) Appl. No.: 12/352,082

(22) Filed: Jan. 12, 2009

(65) Prior Publication Data

US 2009/0182481 A1    Jul. 16, 2009

Related U.S. Application Data

(60) Provisional application No. 61/010,816, filed on Jan. 11, 2008.

(51) Int. Cl.
*G06F 19/00* (2011.01)
(52) U.S. Cl.
USPC .. 701/110; 701/115; 123/406.17; 123/406.23
(58) Field of Classification Search
USPC ......... 701/101, 102, 103, 110, 112, 114, 115; 123/406.11, 406.17, 406.23, 406.49, 123/406.55, 406.58
See application file for complete search history.

(56) References Cited

U.S. PATENT DOCUMENTS

| 5,509,394 | A | * | 4/1996 | Hitomi et al. ............... 123/559.1 |
| 5,789,051 | A | | 8/1998 | Tracy |
| 6,167,343 | A | | 12/2000 | Bauerle |
| 6,681,752 | B1 | | 1/2004 | Kreikemeier et al. |
| 6,745,620 | B2 | | 6/2004 | Kreikemeier et al. |
| 7,062,916 | B2 | * | 6/2006 | Kamijo et al. ................... 60/706 |
| 7,086,382 | B2 | * | 8/2006 | Daniels et al. ........... 123/406.23 |
| 7,104,043 | B2 | * | 9/2006 | Zhu et al. ......................... 60/284 |
| 7,213,573 | B2 | * | 5/2007 | Daniels et al. ........... 123/406.28 |
| 7,512,477 | B2 | * | 3/2009 | Quigley et al. ................ 701/103 |
| 2002/0134637 | A1 | * | 9/2002 | Salecker et al. ............ 192/54.1 |
| 2005/0109318 | A1 | * | 5/2005 | Ichihara et al. .......... 123/406.45 |
| 2005/0266957 | A1 | * | 12/2005 | Kamijo et al. ..................... 477/3 |

* cited by examiner

*Primary Examiner* — John Kwon
(74) *Attorney, Agent, or Firm* — Richards Patent Law P.C.

(57) ABSTRACT

A system and method for limiting torque produced by each of piston engine driven race cars in which the engine ignition timing is set by reference to an ignition timing table and a torque table. The engine torque is sensed by a torque sensor installed in the drive train and engine speed by an RPM sensor. An ECU receives the torque and engine speed signals and sets the ignition timing in accordance with the ignition tables to produce torque levels below the maximum capacity of the engine. If the sensed torque exceeds the torque level in the torque table, the ignition table value is adjusted by the ECU to maintain the preset torque limits. If the sensed torque level declines below the preset limit, the ECU adjusts the ignition table values to increase the torque level correspondingly but only when the throttle is sensed to be fully advanced.

6 Claims, 2 Drawing Sheets

ENGINE PERFORMANCE EQUALIZATION SYSTEM AND METHOD

CROSS REFERENCE TO RELATED APPLICATIONS

This application claims the benefit of U.S. provisional application Ser. No. 61/010,816 filed on Jan. 11, 2008.

BACKGROUND OF THE INVENTION

This invention concerns methods and systems for limiting the power output of the engines in all of the race cars in a race. This is widely practiced in auto racing in order to equalize the power of all the race cars competing in a race. This can even be used to equalize engines with slightly different displacements and components from different model years.

This has been done in the past by various means such as specifying specific parts to be used in the engine, by putting restrictor plates in the intake system, and dynamometer testing and then mechanically sealing the engines. Other approaches have involved limiting vehicle acceleration or power output electronically by sensing engine operating parameters.

There are inherent inaccuracies in these methods and they are able to be evaded or compensated for by other means. Some require engine teardowns at the track to verify compliance or removing the engine and sending it to a specific company for testing and sealing, both expensive and time consuming processes.

It is an object of the present invention to provide a system and method of limiting the power output of engines of race cars to equalize the torque output of all the race cars competing in a race, which is more accurate and deters evasive measures yet is practical, reliable and foolproof.

SUMMARY OF THE INVENTION

The above recited object as well as other objects which will become apparent upon a reading of the following specification and claims are achieved by sensing engine torque as by installing a drive line torque sensor in a vehicle driveline, such as on a driveshaft, clutch, transmission output shaft, differential input shaft, etc.

The torque sensor output signals are sent to an engine control unit (ECU), which normally controls the ignition timing to be in accordance with a ignition look up table which contains spark advance settings for a given engine RPM which will reduce the engine generated torque and thereby produce a controlled reduced engine generated torque to thereby limit engine power output at each engine speed in its operational range and thereby equalize the torque output for the engines all of the race cars in the race.

The sensed torque is electronically compared to the preset reduced corresponding torque value at the sensed engine speed.

This is done by reference to a look up torque table whereat preset limited torque values corresponding to each engine speed (RPM) are stored and the ECU compares this to the actual sensed torque.

Variations in atmospheric pressure and temperature affect the amount of torque an engine will develop. Either the sensed torque or the torque limit value can be compensated by a correction formula with computations in the ECU. If the torque is sensed at a point in the drive train affected by gearing ratios, the sensed torque value is also corrected to take this into account.

Once the corrected sensed engine torque value is determined, it is compared to the preset stored limited value of torque at any given RPM.

If the corrected sensed torque value is greater than the preset limited torque by a predetermined amount, the look up ignition table values are to correspondingly reset to that of a reduced engine torque and the engine ignition timing is reset in accordance therewith to reduce the torque to the preset allowable value.

If the sensed engine torque is less than an under torque value beyond an operating tolerance, the throttle position is sensed, and if at 100%, the ignition timing value in the ignition table at that RPM is reset so as to increase engine torque and the engine ignition timing reset accordingly.

According to one aspect of the present invention, the ECU to practice the invention may be supplied by the race authority, preprogrammed with the torque and ignition timing tables and signal processing software.

The atmospheric temperature and pressure values may be preset at race time in the ECU's of the race cars in the race as by using wireless transmissions operated by the race authority.

This effectively prevents any evasive efforts by race crews to compensate for or to avoid the sought for limitation of engine torque/power output.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The system and method of the present invention are applicable to each of the plurality of race cars in a race.

Figure 1:
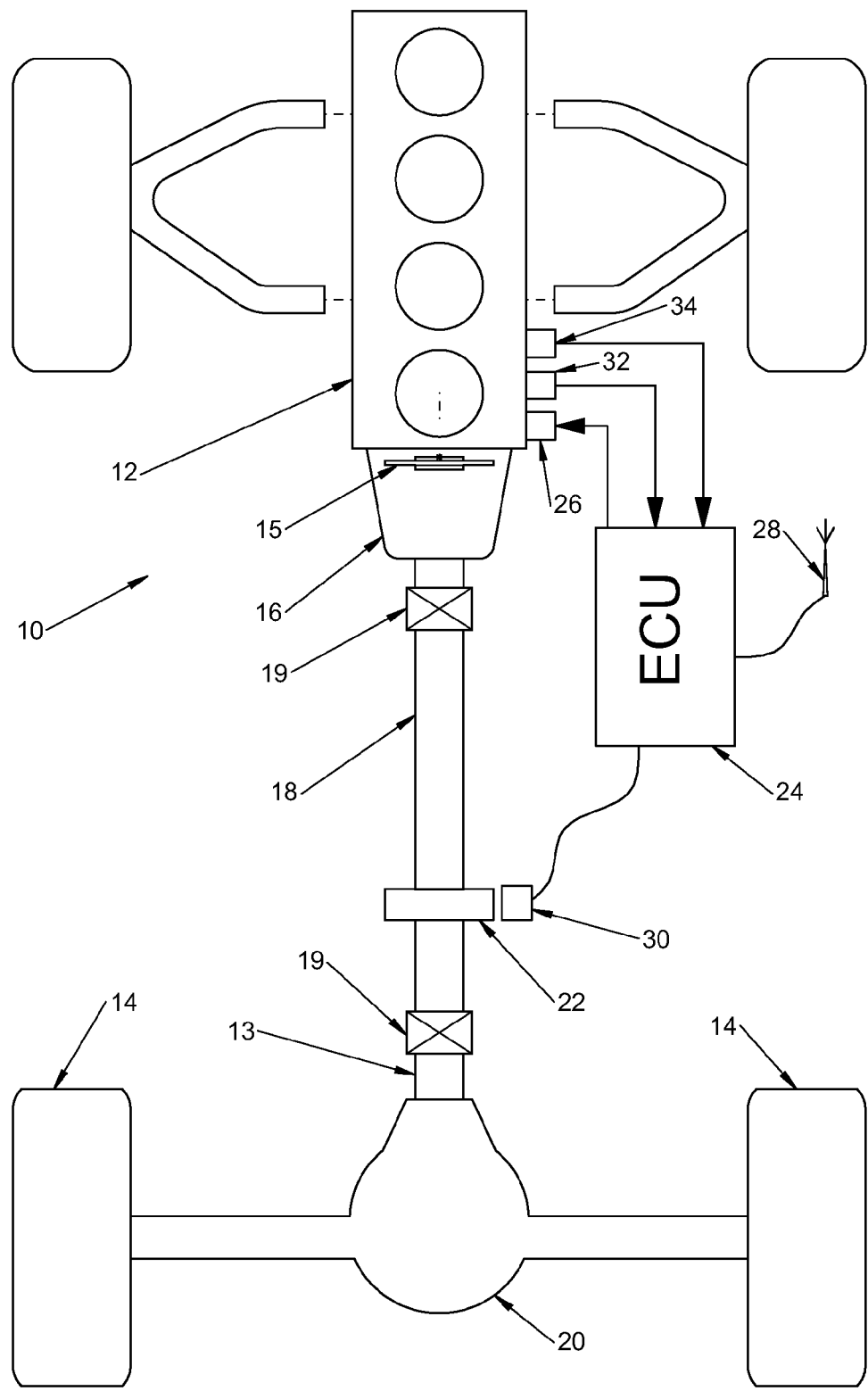
FIG. 1 is a diagrammatic representation of the components of a system according to the present invention.

Referring to the drawings and particularly FIG. 1, a wheeled race car vehicle 10 typical of all the cars in the race is depicted in diagrammatic form, having an internal combustion piston engine 12 powering two rear wheels 14 via a drive train here shown as comprised of a clutch 15, transmission 16, drive shaft 18, U-joints 19 and differential 20.

According to the concept of the present invention an inline drive train torque sensor 22 is installed in order to sense engine torque, the sensor 22 here shown as installed on the drive shaft 18, but it could be installed at other locations along the drive train such as the clutch 15, transmission output shaft, or differential input shaft 13.

Such torque sensors are commercially available, as from Accumetric (Schenectady, N.Y.), Binsfeld (Maple City, Mich.), Land-and-Sea (Concord, N.H.) and Tecat Engineering (Ann Arbor, Mich.)

An electronic engine control unit (ECU) 24 is connected to the ignition system 26 of the vehicle engine 12 and to the torque sensor 22 with signals transmitted from a transmitter/receiver 30 to the ECU via an antenna. The ECU 24 would preferably be provided by the race authority as would the torque sensor 22 which could be of a known clamp-on design. Integrated installations could alternatively be used. A clamp-on connection is preferred as that would enable quick and easy installation and replacement of the torque sensor 22.

According to the one aspect of the concept of the invention, the power output of the engine 12 is derated slightly, i.e., by approximately 3% to generate an engine generated torque at each engine speed reduced from the normal torque that the engine is capable of generating with optimal ignition timing. Such reduced power output is provided by appropriate settings of the ignition timing in accordance with an ignition look up table stored in ECU memory in the known manner.

The values of ignition timing settings for corresponding preset limit torques at each engine RPM are stored in the ignition look up table, engine RPM being sensed by RPM sensor 32.

In addition, the preset limited torque values at each engine RPM is determined and stored in a torque table also contained in ECU memory.

Since torque varies with atmospheric pressure and temperature conditions, a correction factor needs to be calculated for atmospheric conditions. This is a well known method for equalizing torque readings in various atmospheric conditions developed by the Society of Automotive Engineers (SAE). The equation is found at SAE 1349 June 90.

The correction factor calculation is programmed in the ECU 24 and the corrected sensed or limited torque values obtained by being multiplied by this correction factor.

The values for atmospheric pressure (air density) and temperature may be sensed by on board sensors, but preferably the race authority will pre-set the values or transmit these values to the ECU 24 at race time, an antenna 28 being provided for this purpose.

Once set, these atmospheric temperature and pressure values would preferably remain constant during the race.

Other methods can be used to program this correction factor such as downloading atmospheric condition values to the ECUs before the race.

Figure 2:
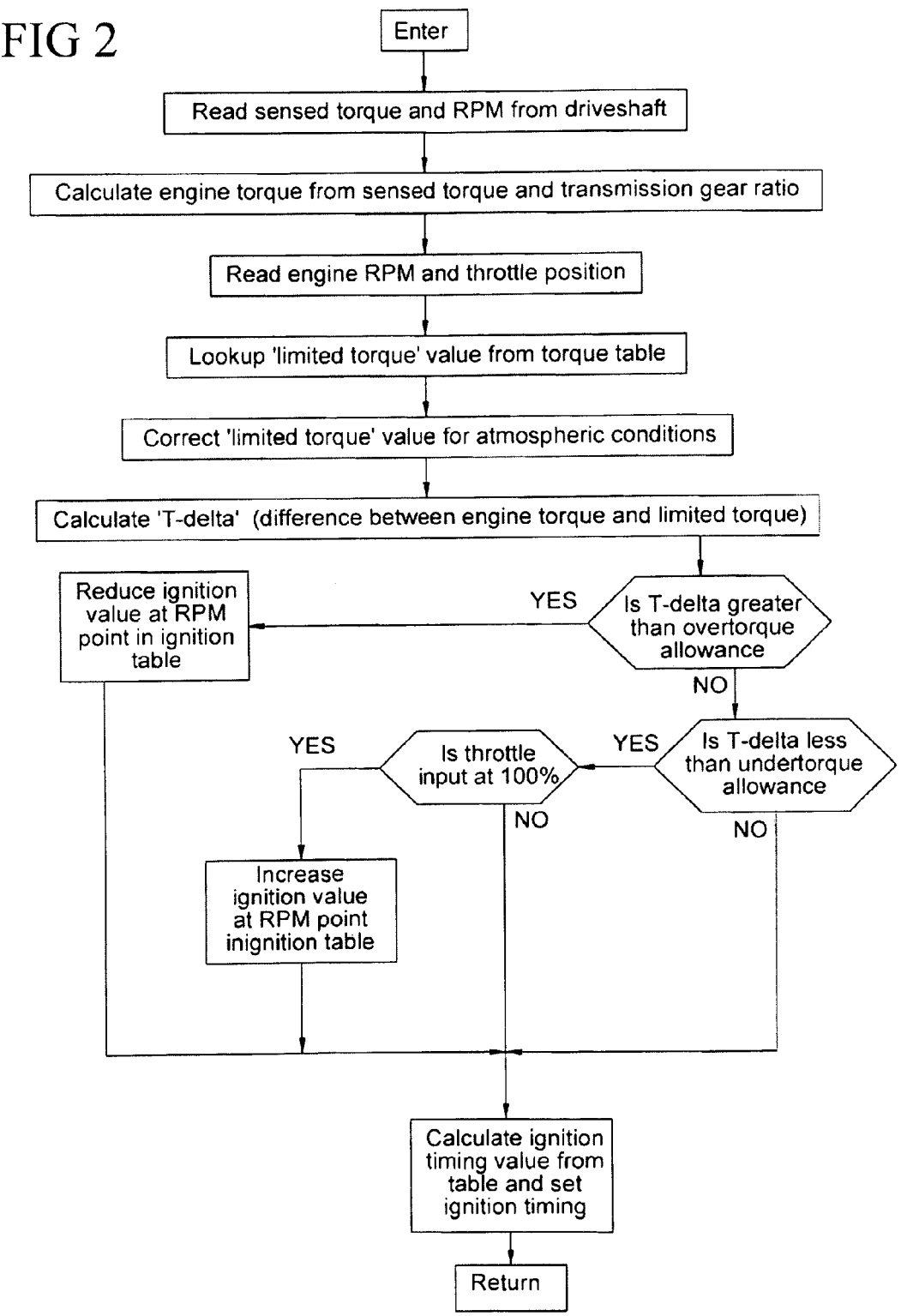
FIG. 2 is a flow chart depicting signal processing carried out in a torque power limiting method according to the present invention.

If the torque load sensor readings are affected by gear ratio, a correction can also be carried out at the same time to correctly reflect engine torque output as indicated in FIG. 2.

Referring to FIG. 2, a flow chart depicts one procedure by which the method of the present invention may be practiced using appropriate signal processing software in the ECU 24.

The engine speed is sensed with the RPM sensor 32 and the engine torque with torque sensor 22. The preset limited torque allowed for the sensed engine speed is looked up from the stored torque table.

The correction factors for air density and temperature and gearing ratios are calculated to obtain the corrected preset limited torque and sensed engine torque level.

The difference between the sensed and corrected preset limited torque levels is then determined.

If the sensed torque is greater than the corrected preset torque limit, the change in ignition timing value corresponding to the reduction in torque necessary to reduce the torque to the present adjusted level is determined and the ignition table value is correspondingly changed.

Finally, the ignition timing advance is reset and sent to the engine ignition system 26 to actually reduce engine torque.

If the sensed torque is less than the preset adjusted torque level, and the throttle position as sensed by a throttle position sensor 34 is at 100% advance, the necessary advance in timing is determined and ignition table values reset and the engine timing reset so that the engine torque output is increased to the preset adjusted torque level, if possible within the 3% or other derated range of the engine power/torque.

This feature reduces the frequency of engine rebuild necessary to maintain maximum allowable engine power. The incorporation of the torquemeter in this system also allows the driver to always know the power output of his engine and eliminates the uncertainty of engine health and the need for frequent and expensive dyno testing to determine engine health.

If the throttle setting is less than 100%, no adjustment of engine timing is carried out as indicated in FIG. 2 and engine timing is set normally from the ignition look up table.

The invention claimed is:

1. A method of equalizing engine performance for two or more race cars participating in a race comprising the steps of:
installing an engine control unit in each of the two or more race cars, each engine control unit including a torque table including preset limited torque values at each engine RPM and an ignition look up table including ignition timing settings required to produce the corresponding preset limited torque value at each engine RPM, each race car including a throttle position sensor, an RPM sensor, and a drive line torque sensor in the race car's driveline, wherein the torque table is identical in each of the plurality of engine control units;
in each race car:
sensing torque, RPM, and throttle position;
looking up the preset limited torque value corresponding to the sensed RPM in the torque table;
calculating the difference between the sensed torque and the preset limited torque value;
when the sensed torque is greater than the preset limited torque value;
looking up the ignition timing required to produce the corresponding preset limited torque value in the ignition lookup table; and
setting the ignition timing in the race car to produce the corresponding preset limited torque value at the sensed engine RPM; and
when the sensed torque is less than the preset limited torque value, determining whether the throttle input is at 100% and, when the throttle input is at 100%;
looking up the ignition timing required to produce the corresponding preset limited torque value in the ignition lookup table; and
setting the ignition timing in the race car to produce the corresponding preset limited torque value.

2. The method of claim 1 wherein the preset limited torque values at each engine RPM correspond to engine performance that is derated from the lowest maximum torque at each RPM of any of the engines of the race cars participating in the race.

3. The method of claim 1 wherein at least two of the race cars have non-identical engines.

4. A method of equalizing engine performance for two or more race cars participating in a race comprising the steps of:
installing an engine control unit in each of the two or more race cars, each engine control unit including a torque table including preset limited torque values at each engine RPM and an ignition look up table including ignition timing settings required to produce the corresponding preset limited torque value at each engine RPM, each race car including a throttle position sensor, an RPM sensor, and a drive line torque sensor in the race car's driveline, wherein the torque table is identical in each of the plurality of engine control units;

setting values for atmospheric pressure and temperature in each of the engine control units for a race time, wherein the values for atmospheric pressure and temperature apply during the race time;

in each race car:
- sensing torque, RPM, and throttle position;
- looking up the preset limited torque value corresponding to the sensed RPM in the torque table;
- correcting the preset limited torque value based on the values of atmospheric pressure and temperature set in the engine control unit to calculate a corrected limited torque value;
- calculating the difference between the sensed torque and the corrected limited torque value;
  - when the sensed torque is greater than the corrected limited torque value;
    - looking up the ignition timing required to produce the corresponding corrected limited torque value in the ignition lookup table; and
    - setting the ignition timing in the race car to produce the corresponding corrected limited torque value at the sensed engine RPM; and
  - when the sensed torque is less than the corrected limited torque value, determining whether the throttle input is at 100% and, when the throttle input is at 100%;
    - looking up the ignition timing required to produce the corresponding corrected limited torque value in the ignition lookup table; and
    - setting the ignition timing in the race car to produce the corresponding corrected limited torque value.

5. The method of claim 4 wherein the preset limited torque values at each engine RPM correspond to engine performance that is derated from the lowest maximum torque at each RPM of any of the engines of the race cars participating in the race.

6. The method of claim 4 wherein at least two of the race cars have non-identical engines.

* * * * *